US007363232B2

(12) United States Patent
Megeid et al.

(10) Patent No.: US 7,363,232 B2
(45) Date of Patent: Apr. 22, 2008

(54) METHOD AND SYSTEM FOR ENABLING AUDIO SPEED CONVERSION

(75) Inventors: Magdy Megeid, Zurich (CH); Markus Inkamp, Pfaeffikon (CH)

(73) Assignee: Thomson Licensing, Boulogne Billancourt (FR)

( * ) Notice: Subject to any disclaimer, the term of this patent is extended or adjusted under 35 U.S.C. 154(b) by 679 days.

(21) Appl. No.: 10/343,615

(22) PCT Filed: Jun. 29, 2001

(86) PCT No.: PCT/IB01/01161

§ 371 (c)(1), (2), (4) Date: Feb. 3, 2003

(87) PCT Pub. No.: WO02/13185

PCT Pub. Date: Feb. 14, 2002

(65) Prior Publication Data

US 2004/0015345 A1 Jan. 22, 2004

Related U.S. Application Data

(60) Provisional application No. 60/224,115, filed on Aug. 9, 2000.

(51) Int. Cl.

*G10L 19/14* (2006.01)
*G10L 21/00* (2006.01)
*G10L 19/00* (2006.01)
*G10L 11/00* (2006.01)
*H04N 5/91* (2006.01)

(52) U.S. Cl. ...................... 704/503; 704/205; 704/211; 704/213; 704/278; 704/500; 386/68

(58) Field of Classification Search ................ 704/205, 704/211, 213, 503, 278, 500; 386/68
See application file for complete search history.

(56) References Cited

U.S. PATENT DOCUMENTS 3,786,195 A * 1/1974 Schiffman .................. 704/211
4,426,730 A * 1/1984 Lajotte et al. ............. 704/233
4,803,730 A * 2/1989 Thomson .................... 704/211
5,611,018 A * 3/1997 Tanaka et al. ............. 704/215
5,749,064 A * 5/1998 Pawate et al. ............. 704/213
5,809,454 A * 9/1998 Okada et al. .............. 704/214

(Continued)

OTHER PUBLICATIONS

H. Weinrichter, E. Brazda, "Time Domain Compression and Expansion of Speech" 1986, Elsevier Science Publishers B.V., (North Holland), Signal Processing III: Theories and Applications.*

(Continued)

*Primary Examiner*—Richemond Dorvil
*Assistant Examiner*—Dorothy S Siedler
(74) *Attorney, Agent, or Firm*—Joseph J. Laks; Harvey Fried; Richard LaPeruta

(57) ABSTRACT

The present invention provides a method and system for processing an audio signal. According to an exemplary method, an audio signal such as a digital voice signal is received and divided into one or more individual unit cycles. An audio speed conversion operation is enabled by repeating or removing one or more of the individual unit cycles. In particular, repeating one or more of the individual unit cycles decreases audio speed, and removing one or more of the individual unit cycles increases audio speed.

24 Claims, 4 Drawing Sheets

U.S. PATENT DOCUMENTS

| | | | | |
|---|---|---|---|---|
| 5,920,842 | A * | 7/1999 | Cooper et al. | 704/503 |
| 6,009,386 | A * | 12/1999 | Cruickshank et al. | 704/207 |
| 7,010,491 | B1 * | 3/2006 | Kikumoto | 704/503 |

OTHER PUBLICATIONS

Dimitrios P. Prezas, Joe Picone, David L. Thompson, "Fast and Accurate Pitch Detection using attern Recognition and Adaptive Time-Domain Analysis " Acousics, Speech, and Signal Processing, IEEE International Conference on ICASSP '86, vol. 11, Apr. 1986 pp. 109-112.*

R. Suzuki, M. Misaki, "Time-Scale Modification of Speech Signals using Cros-Correlation functions" IEEE Transactions on Consumer Electronics Aug. 1992 vol. 38 Issue 3 pp. 357-383.*

* cited by examiner

METHOD AND SYSTEM FOR ENABLING AUDIO SPEED CONVERSION

CROSS REFERENCE TO RELATED APPLICATION

This application claims the benefit under 35 U.S.C. § 365 of International Application PCT/IB01/01161 filed Jun. 29, 2001, which was published in accordance with PCT Article 21(2) on Feb. 14, 2002 in English; and which claims benefit of U.S. provisional application Ser. No. 60/224,115 filed Aug. 9, 2000.

BACKGROUND

1. Field of the Invention

The present invention generally relates to audio speed conversion, and more particularly, to a method and system that enables audio speed conversion such as voice speed conversion.

2. Background Information

Speed conversion systems can be used to enable multiple speed operation (e.g., fast, slow, etc.) in video and/or audio reproduction systems, such as color television (CTV) systems, video tape recorders (VTRs), digital video/versatile disk (DVD) systems, compact disk (CD) players, hearing aids, telephone answering machines and the like. Conventional audio speed converters generally differentiate between a silence interval and a sound interval in an audio signal. Deleting the silence interval and compressing the sound interval results in an increased audio speed. Conversely, expanding the silence and sound intervals results in a decreased audio speed. Many conventional audio speed converters increase or decrease audio speed at a constant rate independent of the contents. Accordingly, these types of audio speed converters can not take full advantage of the silence and redundant intervals of an audio signal.

The process of removing or repeating intervals of an audio signal can be problematic since it often produces undesirable audible "clicks." Additionally, the pitch of an audio signal should not be changed or transformed to other frequencies since the human ear tends to be quite sensitive to these changes. Known prior art algorithms such as the "pointer interval control overlap and add" (PICOLA) algorithm address these problems by multiplying an audio signal by a window function in an attempt to smooth the output signal and maintain the original pitch. This results in producing synthetic waveforms that were not part of the original audio signal. Moreover, the use of such algorithms typically requires utilization of fast digital signal processors (DSPs), which tend to be expensive. Accordingly, it is desirable to provide an audio speed converter which avoids the use of expensive digital signal processors (DSPs), and utilizes more cost-effective processing means such as small programmable logic devices (PLDs). The present invention addresses these and other problems.

SUMMARY

In accordance with an aspect of the invention, a system for processing an audio signal comprises means for receiving the audio signal and dividing the received audio signal into one or more individual unit cycles and means for enabling an audio speed conversion operation by one of repeating and removing one or more of the individual unit cycles.

In accordance with another aspect of the invention, a method for processing an audio signal comprises steps of receiving the audio signal, dividing the received audio signal into one or more individual unit cycles, and enabling an audio speed conversion operation by one of repeating and removing one or more of the individual unit cycles.

The exemplifications set out herein illustrate preferred embodiments of the invention, and such exemplifications are not to be construed as limiting the scope of the invention in any manner.

DESCRIPTION OF THE PREFERRED EMBODIMENTS

This application discloses a system and a method for processing an audio signal which provide advantages over conventional techniques. According to an exemplary system and an exemplary method, an audio signal such as a digital voice signal is received and divided into one or more individual unit cycles. An audio speed conversion operation is enabled by repeating or removing one or more of the individual unit cycles. In particular, repeating one or more of the individual unit cycles decreases audio speed, and removing one or more of the individual unit cycles increases audio speed. According to a preferred embodiment, the received audio signal is divided into one or more individual unit cycles in dependence upon a reference value such that an individual unit cycle starts at a first sample of the received audio signal that is equal to or greater than the reference value and ends at a last sample of the received audio signal that is less than the reference value.

The method may also include a step of determining whether each of the one or more individual unit cycles corresponds to a silence interval. This determination may be made in dependence upon an average power value for each of the one or more individual unit cycles. According to a preferred embodiment, the average power value for each of the one or more individual unit cycles is determined in dependence upon an average amplitude value for each of the one or more individual unit cycles. The method may also include a step of detecting one or more pitch periods in the received audio signal, wherein each of the one or more pitch periods includes one or more of the individual unit cycles. This detection may be in dependence upon the average power value for each of the one or more individual unit cycles. An audio speed conversion system capable of performing the foregoing method is also provided herein.

Figure 1:
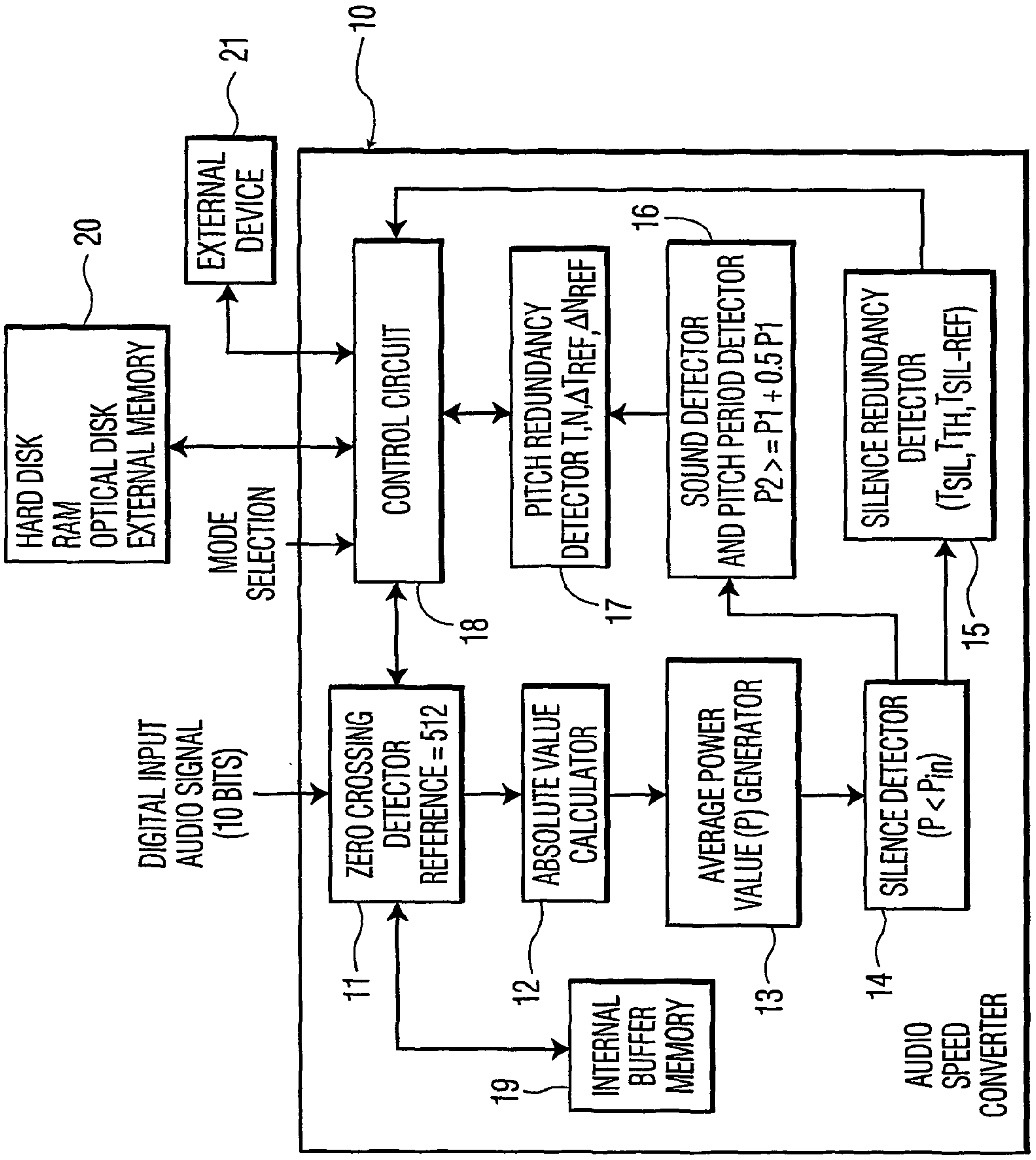
FIG. 1 is an audio speed converter constructed according to principles of the present invention.

Referring now to the drawings, and more particularly to FIG. 1, an audio speed converter 10 constructed according to principles of the present invention is shown. In FIG. 1, an audio speed converter 10 includes a zero crossing detector 11 which receives an input audio signal. The zero crossing detector 11 samples the input audio signal and compares the sampled values to a zero reference value. Sampled values that are greater than or equal to zero reference value correspond to a positive input signal, and sampled values less than the zero reference value correspond to a negative input signal. As will be discussed later herein, the input audio signal is divided into a series of single unit cycle waveforms.

An absolute value calculator 12 receives the sampled values of the input audio signal from the zero crossing detector 11, and computes the absolute value of each sample. An average power value (P) generator 13 receives the absolute values computed by the absolute value calculator 12, and calculates an average power value (P) for each cycle of the input audio signal based on the absolute values. In accordance with principles of the present invention, it is important to calculate the average power value (P) of a single unit cycle waveform, and not of a single frame that contains a fixed number of samples, as is the case with many conventional audio speed converters. According to a preferred embodiment, the average power value (P) is calculated on the basis of the average amplitude value. That is, the average power value (P) is equal to the sum of the sample values divided by the total number of samples in a cycle. In this manner, the average power value (P) is computed for each cycle of the input audio signal.

A silence detector 14 receives the average power values (P) from the average power value (P) generator 13 and performs a comparison operation to determine whether or not each cycle corresponds to a silence interval. In particular, the silence detector 14 compares each average power value (P) with a reference threshold value. When one or more cycles corresponding to a silence interval are identified, a silence redundancy detector 15 may be utilized in certain modes to calculate the duration of the silence intervals and expand or compress the silence interval in accordance with principles of the present invention. Further details regarding the expansion and compression of intervals will be provided later herein. Alternatively, when one or more cycles not corresponding to a silence interval are identified, a sound detector and pitch period detector 16 detects a sound interval in the input audio signal, and further detects the start of different pitch periods. A pitch redundancy detector 17 detects redundancies in pitch periods in accordance with principles of the present invention. Further details regarding the detection of sound intervals and pitch periods will be provided later herein.

A control circuit 18 controls the general operation of the audio speed converter 10. For example, the control circuit 18 enables outputs from the audio converter 10 to be stored in an internal buffer memory 19 or an external storage device 20 such as a hard disk, a random access memory (RAM), an optical disk or other external memory. The control circuit 18 also enables outputs from the audio converter 10 to be transferred to an external device 21 such as a speaker or other device, and receives inputs regarding modes of operation. As will be discussed later herein, the audio speed converter 10 of FIG. 1 has three different modes of operation: a fast mode, a slow mode, and a standby mode.

Further details regarding operation of the audio speed converter 10 constructed according to principles of the present invention will now be provided with reference to FIGS. 1 through 6.

As previously indicated, in FIG. 1 the zero crossing detector 11 of the audio speed converter 10 receives an input audio signal. According to a preferred embodiment, the input audio signal is a 10 bit digital signal. It is contemplated, however, that input signals of other bit lengths may be accommodated in accordance with principles of the present invention. The zero crossing detector 11 samples the input audio signal and compares the sampled values to a zero reference value. According to a preferred embodiment, the zero reference value is 512. It is contemplated, however, that other zero reference values may be utilized in accordance with principles of the present invention. As previously indicated, the input audio signal is divided into a series of single unit cycle waveforms.

Figure 2:
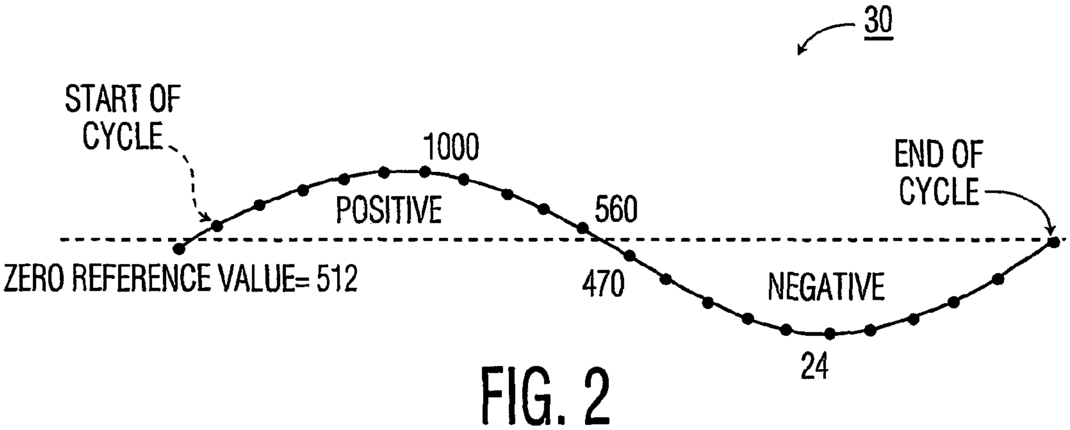
FIG. 2 is a single unit cycle of an exemplary input audio signal according to principles of the present invention.

Referring now to FIG. 2, a schematic diagram of a single cycle 30 of an exemplary input audio signal is shown. In FIG. 2, the dots represent exemplary points sampled by the zero crossing detector 11 of FIG. 1 and the numbers (i.e., 1000, 560, 470, 24) represent possible values of certain samples (assuming 10 bits of resolution). As previously indicated, the zero crossing detector 11 uses a zero reference value of 512 in a preferred embodiment, which is one half a maximum value of 1024 (assuming 10 bits of resolution). Consequently, sampled values that are greater than or equal to 512 correspond to a positive input signal, and sampled values less than 512 correspond to a negative input signal. By comparing the sampled values with a zero reference value, the input signal can be divided into a series of single unit cycle waveforms, such as the one shown in FIG. 2. According to principles of the present invention, a single unit cycle of the input audio signal is measured from the first sample of the positive half-wave (value$\geqq$512) to the last sample of the negative half-wave (value<512). Such a cycle is the smallest unit of a signal that is eliminated or repeated by the audio speed converter 10. As will be discussed later herein, the audio speed converter 10 of FIG. 1 only deletes or repeats complete unit cycles of the input audio signal. The advantage of this method is that signal deletion or insertion always takes place at zero crossing points, thus preventing any audible clicks in an output audio signal. In this way, the present invention advantageously provides output audio signals comprised of actual audio information without synthetic waveforms. In the conventional "pointer interval control overlap and add" (PICOLA) algorithm, an input audio signal is multiplied by a window function which results in producing synthetic waveforms that were not part of the original audio signal.

Referring back to FIG. 1, the absolute value calculator 12 receives the sampled values of the input audio signal from the zero crossing detector 11, and computes the absolute value of each sample. The average power value (P) calculator 13 receives the absolute values computed by the absolute value calculator 12, and calculates an average power value (P) for each cycle of the input audio signal based on the absolute values. In accordance with principles of the present invention, it is important to calculate the average power value (P) of a single cycle waveform, and not of a single frame that contains a fixed number of samples, as is the case with many conventional audio speed converters. According to a preferred embodiment, the average power value (P) is calculated on the basis of the average amplitude value. That is, the average power value (P) is equal to the sum of the sample values divided by the total number of samples in a cycle. In this manner, the average power value (P) is computed for each cycle of the input audio signal.

The silence detector 14 receives the average power values (P) from the average power value (P) generator 13 and performs a comparison operation to determine whether or not each cycle corresponds to a silence interval. In particular, the silence detector 14 compares each average power value (P) with a reference threshold value $P_{SIL}$, which may be set according to design choice. If $P<P_{SIL}$, the corresponding cycle is identified as a silence interval, and if $P \geqq P_{SIL}$, the corresponding cycle is identified as not being a silence interval (i.e., it contains recognizable sound). In situations where $P<P_{SIL}$, the silence redundancy detector 15 may be utilized in certain modes to calculate the duration of the silence intervals and expand or compress the silence interval in accordance with principles of the present invention. Further details regarding this operation will now be provided.

Figure 3:
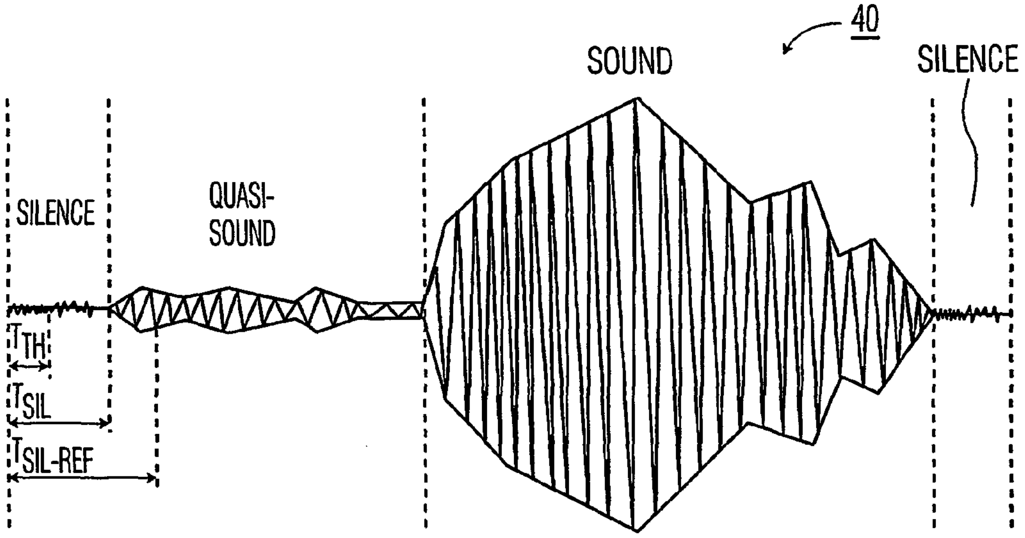
FIG. 3 is a waveform illustrating an exemplary audio signal according to principles of the present invention.

Referring to FIG. 3, a schematic diagram of a waveform 40 of an exemplary audio signal is shown. The waveform 40 of FIG. 3 may approximate the input audio signal to the audio speed converter 10 of FIG. 1. In FIG. 3, the audio signal waveform 40 illustrates three different types of intervals: a silence interval, a quasi-sound interval, and a sound interval. A silence interval mainly contains background noise and is of very low amplitude, with a low and constant average power. When the audio speed converter 10 of FIG. 1 is in the fast mode, the silence redundancy detector 15 can compress a silence interval by removing part of the silence interval. For example, in FIG. 3 if the silence interval $T_{SIL}$ is long, then an interval equal to $T_{SIL}$-$T_{TH}$ can be removed. The threshold time $T_{TH}$ in FIG. 3 is a delay time that must elapse before compression of a silence interval can occur. In this manner, sounds (e.g., speech) represented by the audio signal can be better understood by a listener.

Additionally, when the audio speed converter 10 of FIG. 1 is in the slow mode, the silence redundancy detector 15 can expand the silence interval by a predetermined time interval equal to $T_{SIL-REF}$-$T_{SIL}$. The parameter $T_{SIL-REF}$ limits the maximum expansion time of a silence interval. Moreover, this parameter causes the expansion of an originally long silence interval to be less than the expansion of an originally shorter interval. In this way, words spoken quickly can be better understood by a listener. If a silence interval is long enough so that the result of $T_{SIL-REF}$-$T_{SIL}$ is negative, then expansion may not take place since there typically is no need to expand an already long silence interval.

As indicated by the waveform 40 of FIG. 3, a quasi-sound interval exhibits greater amplitude than a silence interval, and is typically random in nature having frequent variations. Due to these frequent variations, a quasi-sound interval tends to exhibit a relatively low degree of periodicity (i.e., redundancy). A sound interval exhibits the largest amplitude of the three types of intervals, and has a periodic structure. Due to this periodicity, a sound interval exhibits some degree of redundancy. Quasi-sound intervals and sound intervals both may represent voice information.

Figure 4:
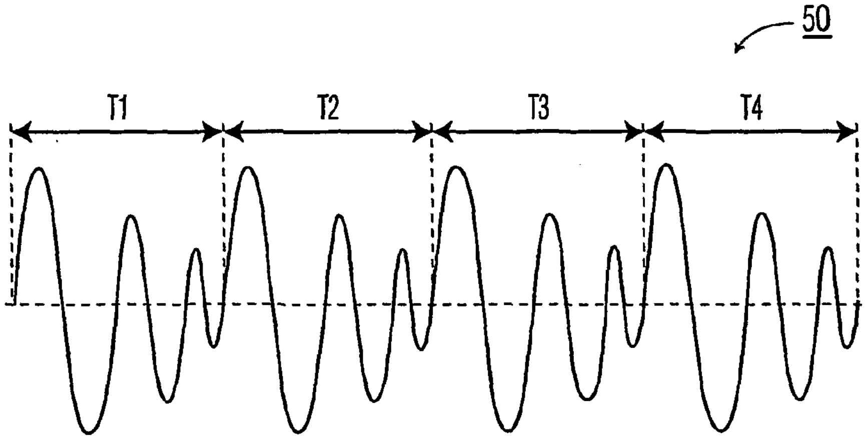
FIG. 4 is a waveform illustrating the periodicity of a sound interval of an exemplary audio signal according to principles of the present invention.

Referring to FIG. 4, a schematic diagram of a waveform 50 illustrating the periodicity of a sound interval of an exemplary audio signal is shown. In particular, the waveform 50 of FIG. 4 illustrates four pitch periods, T1 through T4. As indicated in FIG. 4, a pitch period is defined by the periodicity (i.e., redundancy) in a sound interval of an audio signal. This redundancy in the sound interval can be used to increase audio speed. For example, in FIG. 4 audio speed can be increased by removing the second and third pitch periods T2 and T3 from the waveform 50. Conversely, repeating the second and third pitch periods T2 and T3 in the waveform 50 decreases audio speed.

Referring back to FIG. 1, when the silence detector 14 determines that $P \geqq P_{SIL}$ for a given cycle, that cycle is transferred to the sound detector and pitch period detector 16 for further processing. In particular, the sound detector and pitch period detector 16 detects a sound interval, such as the one shown in the waveform 40 of FIG. 3, and further detects the start of pitch periods, such as the ones shown in the waveform 50 of FIG. 4. Further details regarding this operation will now be provided.

Figure 5:
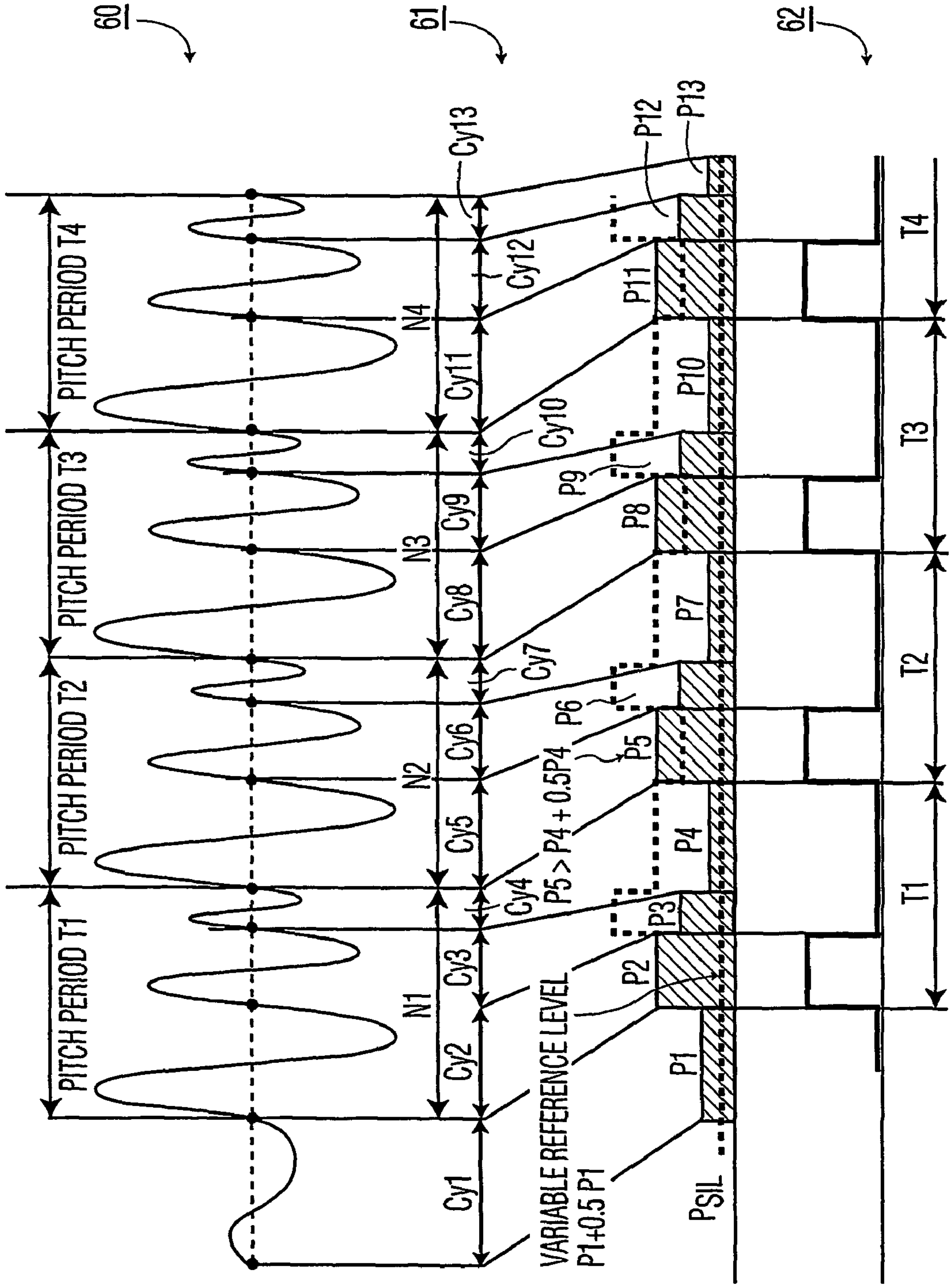
FIG. 5 is a series of waveforms illustrating an example of detecting a sound interval and a pitch period according to principles of the present invention.

Referring to FIG. 5, a series of waveforms illustrating an example of detecting a sound interval and a pitch period according to principles of the present invention are shown. In FIG. 5, a waveform 60 shows an exemplary input audio signal having pitch periods T1 through T4. Each pitch period includes one or more cycles. For example, in FIG. 5 the pitch period T1 includes cycles Cy2, Cy3 and Cy4. The pitch period T2 includes cycles Cy5, Cy6 and Cy7. The pitch period T3 includes cycles Cy8, Cy9 and Cy10. The pitch period is T4 includes cycles Cy11, Cy12 and Cy13. The number of cycles included in the pitch periods T1 through T4 is represented by the values N1 through N4, respectively. A waveform 61 illustrates the average amplitude values corresponding to the different cycles. In particular, cycles Cy1 through Cy13 have average power values P1 through P13, respectively. Note that all of the average power values P1 through P13 in FIG. 5 are above the silence threshold value $P_{SIL}$, which is shown as a dotted line.

As indicated by the waveform 60, the cycles Cy2, Cy5, Cy8 and Cy11 each represent the start of a given pitch period detected by the sound detector and pitch period detector 16 of FIG. 1. This detection may be enabled via the average power values. That is, the average power values P2, P5, P8 and P11 corresponding to the cycles Cy2, CyS, Cy8 and Cy11 are higher than the average power values of the other cycles. Accordingly, power (e.g., amplitude) value is a useful criterion for detecting the start of pitch periods. Since certain audio signals such as voice signals are dynamic in that their power values vary with time, a reference level (i.e., value) used to detect pitch periods should also vary with time and follow changes in the input audio signal. Therefore, the present invention uses a reference value for detecting pitch periods wherein a reference value for one cycle depends on the average power value of a previous cycle. According to a preferred embodiment, the reference value for a given cycle is set equal to the average power value of an immediately preceding cycle multiplied by a constant that is between 1 and 2. Therefore, assuming for example that the constant is 1.5, the power value P2 is compared to 1.5 times the power value P1. Similarly, the power value P3 is compared to 1.5 times the power value P2, and so on. In this manner, the reference value used to detect pitch periods varies from cycle to cycle and exactly follows the dynamic change of an audio signal such as a voice signal. Therefore, according to principles of the present invention, if the average amplitude value of one cycle is greater than or equal to its reference value, then that cycle is identified as the start of a pitch period and a logic high signal is generated for output by the sound detector and pitch period detector 16. This output signal of the sound detector and pitch period detector 16 is represented by a waveform 62 in FIG. 5. The rising edge of this output signal may be used to set a memory address pointer to indicate the start of a pitch period.

A detected pitch period may be characterized by two parameters: its duration T and its total number of cycles N. The similarity between two successive pitch waveforms can be determined by comparing these parameters. In FIG. 1, the pitch redundancy detector 17 calculates a difference in duration between two successive pitch periods (e.g., T1 and T2 in FIG. 5) and compares the result to a reference value $\Delta T_{REF}$. The pitch redundancy detector 17 then calculates a difference in the number of cycles (e.g., N1 and N2 in FIG. 5) between the two successive pitch periods, and compares the result to another reference value $\Delta N_{REF}$. According to a preferred embodiment, if the two conditions $|T2-T1| \leqq \Delta T_{REF}$ and $|N2-N1| \leqq \Delta N_{REF}$ are fulfilled, the two corresponding pitch periods are considered to be identical. The chance of identifying two identical pitch periods in a quasi-sound interval, such as the one shown in FIG. 3, is relatively low. However, the chance of identifying two identical pitch periods in a sound interval, such as the one shown in FIG. 3, is higher. When the audio speed converter 10 of FIG. 1 is in the fast mode of operation, the second of two identical periods is removed from an audio signal. By doing this, the signal redundancy decreases and audio speed increases. Conversely, when the audio speed converter 10 of FIG. 1 is in the slow mode of operation, the second of two identical periods is repeated in an audio signal. By doing this, the signal redundancy increases and audio speed decreases.

Figure 6:
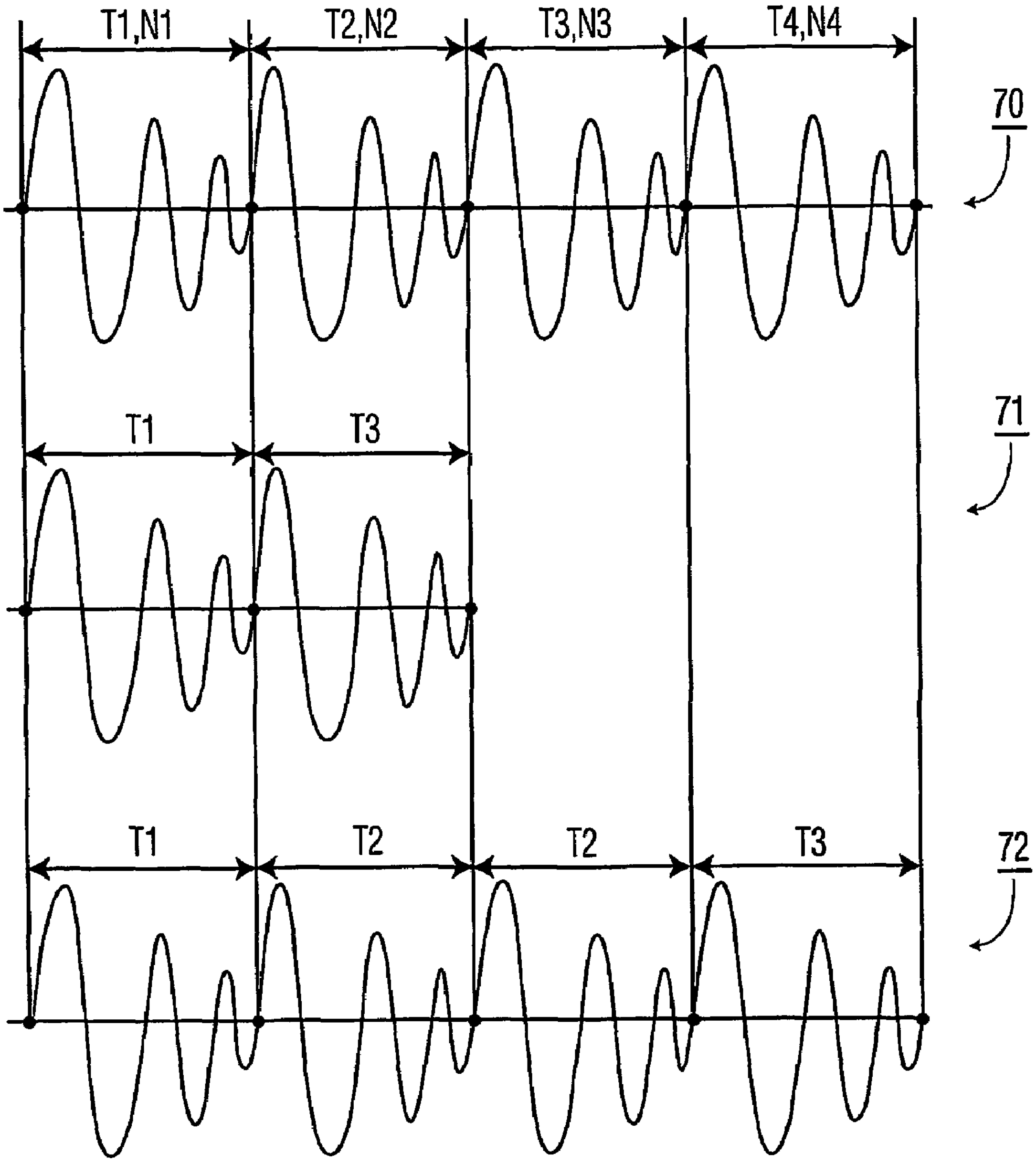
FIG. 6 is a series of waveforms illustrating examples of audio signal compression and expansion according to principles of the present invention.

Referring to FIG. 6, a series of waveforms illustrating examples of audio signal compression and expansion according to principles of the present invention are shown. In FIG. 6, a waveform 70 illustrates a situation where no signal compression or expansion is performed. Accordingly, all four pitch periods having durations T1 through T4, respectively, are included in an audio signal. A waveform 71 illustrates a situation where signal compression is performed. In particular, only the pitch periods having durations T1 and T3 are included in an audio signal, thereby decreasing signal redundancy. The waveform 71 may result when the audio speed converter 10 of FIG. 1 is in the fast mode of operation. A waveform 72 illustrates a situation where signal expansion is performed. In particular, the pitch period having duration T2 is repeated in an audio signal, thereby increasing signal redundancy. The waveform 72 may result when the audio speed converter 10 of FIG. 1 is in the slow mode of operation. When the audio speed converter 10 is in the standby mode of operation, an input audio signal is simply looped through the audio speed converter 10 without any speed variation. When the audio speed converter 10 is in the fast or slow modes of operation, the number of deleted or repeated cycles is controlled by the control circuit 18. Therefore, the control circuit 18 can calculate the audio speed at any given moment and provide the result to other devices, such as the internal buffer memory 19, the external storage device 20 and/or the external device 21.

Certain other attributes of the present invention have been identified. For example, when the audio speed converter 10 is in the fast mode of operation, best results are obtained at a speed that is a maximum of twice the original speed. If the speed is higher, sounds such as speech become less understandable to a listener. Nevertheless, higher speeds may be used in applications such as a fast forward function of a video tape recorder (VTR) where a complete comprehension of the audio information is not required. In such cases, it may be necessary to increase the values of the reference parameters $T_{TH}$, $T_{SIL\text{-}REF}$, $P_{SIL}$, $\Delta T_{REF}$ and $\Delta N_{REF}$. When the audio speed converter 10 is in the slow mode of operation, best results are obtained at a speed that is not lower than half the original speed. While the present invention is particularly suitable for processing voice signals, the principles of the present invention may also be applied to the processing of audio signals in general, including audio signals such as music containing data other than and/or in addition to voice data.

As described above, the present invention provides several advantages over conventional audio speed conversion devices. Exemplary features of the present invention are as follows:

Deletion or insertion of parts of an audio signal always occurs at zero crossing points, thereby eliminating audible clicks.

Simple and fast signal processing is enabled since no multiplication is required at the deletion or insertion points.

An input voice signal is divided into variable-length cycles/frames, wherein each cycle/frame is equal to a variable number of signal samples depending on the frequency of the input audio signal.

Elimination (i.e., removal) or insertion (i.e., repetition) of parts of an audio signal only takes place if two successive periods are found to be identical.

Only part of a silence interval is deleted. The expansion of a silence interval is inversely proportional to its duration.

No time or speed limit for the signal processing is imposed. This results in good quality audio reproduction. Conventional audio speed converters often eliminate or repeat a section of an audio signal depending on the overflow or underflow of a buffer memory. Also, they often have time and speed limits, which have to be fulfilled. This often results in loosing complete sections of an audio signal.

The resulting output signal, independent of the momentary speed, contains only parts of the original audio signal. No synthetically produced parts are included.

The resulting audio speed is not constant. The rate of speed change depends on the parameters $T_{TH}$, $T_{SIL\text{-}REF}$, $P_{SIL}$, $\Delta T_{REF}$, $\Delta N_{REF}$ and the input signal. In the fast mode, an input signal that contains more silence intervals and more identical intervals will result in a faster output signal than an input signal having the same duration but opposite features. In the slow mode, the audio speed converter proceeds in a way that short silence intervals are expanded more than long silence intervals.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

The invention claimed is:

1. A system for processing an audio signal, comprising:

means for receiving said audio signal and dividing said received audio signal into one or more individual unit cycles;

means for enabling an audio speed conversion operation by one of repeating and removing one or more of said individual unit cycles;

means for detecting one or more pitch periods in said received audio signal, wherein each of said one or more pitch periods includes one or more of said individual unit cycle;

means for generating an average power value for each of said one or more individual unit cycles; and wherein said detecting means detects said one or more pitch periods in said received audio signal in dependence upon said average power value for each of said one or more individual unit cycles.

2. The system of claim 1, wherein said receiving means divides said received audio signal into said one or more individual unit cycles in dependence upon a reference value such that an individual unit cycle starts at a first sample of said received audio signal that is equal to or greater than said reference value and ends at a last sample of said received audio signal that is less than said reference value.

3. The system of claim 1, wherein repeating one or more of said individual unit cycles decreases audio speed.

4. The system of claim 1, wherein removing one or more of said individual unit cycles increases audio speed.

5. The system of claim 1, wherein said received audio signal is a digital voice signal.

6. The system of claim 1, further comprising means for determining whether each of said one or more individual unit cycles corresponds to a silence interval in dependence upon said average power value for each of said one or more individual unit cycles.

7. The system of claim 1, wherein said generating means generates said average power value for each of said one or more individual unit cycles in dependence upon an average amplitude value for each of said one or more individual unit cycles.

8. An audio speed conversion system, comprising:

a signal detector for receiving an audio signal and dividing said received audio signal into one or more individual unit cycles;

circuitry for enabling an audio speed conversion operation by one of repeating and removing one or more of said individual unit cycles;

a pitch period detector for detecting one or more pitch periods in said received audio signal, wherein each of said one or more pitch periods includes one or more of said individual unit cycles;

an average power value generator for generating an average power value for each of said one or more individual unit cycles; and wherein said pitch period detector detects said one or more pitch periods in said received audio signal in dependence upon said average power value for each of said one or more individual unit cycles.

9. The audio speed conversion system of claim 8, wherein said signal detector divides said received audio signal into said one or more individual unit cycles in dependence upon a reference value such that an individual unit cycle starts at a first sample of said received audio signal that is equal to or greater than said reference value and ends at a last sample of said received audio signal that is less than said reference value.

10. The audio speed conversion system of claim 8, wherein repeating one or more of said individual unit cycles decreases audio speed.

11. The audio speed conversion system of claim 8, wherein removing one or more of said individual unit cycles increases audio speed.

12. The audio speed conversion system of claim 8, wherein said received audio signal is a digital voice signal.

13. The audio speed conversion system of claim 8, further comprising a silence detector for determining whether each of said one or more individual unit cycles corresponds to a silence interval in dependence upon said average power value for each of said one or more individual unit cycles.

14. The audio speed conversion system of claim 8, wherein said average power value generator generates said average power value for each of said one or more individual unit cycles in dependence upon an average amplitude value for each of said one or more individual unit cycles.

15. The audio speed conversion system of claim 8, wherein said average power value generator generates said average power value for each of said one or more individual unit cycles in dependence upon an average amplitude value for each of said one or more individual unit cycles.

16. A method for processing an audio signal, comprising steps of:

receiving said audio signal;

dividing said received audio signal into one or more individual unit cycles;

enabling an audio speed conversion operation by one of repeating and removing one or more of said individual unit cycles;

of detecting one or more pitch periods in said received audio signal, wherein each of said one or more pitch periods includes one or more of said individual unit cycles; and wherein said step of detecting one or more pitch periods in said received audio signal is performed in dependence upon an average power value for each of said one or more individual unit cycles.

17. The method of claim 16, wherein said received audio signal is divided into said one or more individual unit cycles in dependence upon a reference value such that an individual unit cycle starts at a first sample of said received audio signal that is equal to or greater than said reference value and ends at a last sample of said received audio signal that is less than said reference value.

18. The method of claim 16, wherein repeating one or more of said individual unit cycles decreases audio speed.

19. The method of claim 16, wherein removing one or more of said individual unit cycles increases audio speed.

20. The method of claim 16, wherein said received audio signal is a digital voice signal.

21. The method of claim 16, further comprising a step of determining whether each of said one or more individual unit cycles corresponds to a silence interval.

22. The method of claim 21, wherein the step of determining whether each of said one or more individual unit cycles corresponds to a silence interval is performed in dependence upon an average power value for each of said one or more individual unit cycles.

23. The method of claim 22, wherein said average power value for each of said one or more individual unit cycles is determined in dependence upon an average amplitude value for each of said one or more individual unit cycles.

24. The method of claim 16, wherein said average power value for each of said one or more individual unit cycles is determined in dependence upon an average amplitude value for each of said one or more individual unit cycles.

* * * * *